US008732258B2

(12) United States Patent
Seminaro et al.

(10) Patent No.: US 8,732,258 B2
(45) Date of Patent: May 20, 2014

(54) METHOD AND SYSTEM FOR TRANSPORTING TELEMETRY DATA ACROSS A NETWORK

(75) Inventors: Michael D. Seminaro, Fairfax, VA (US); Christopher Eugene Mar, Leesburg, VA (US); Alan Keith Harder, Sunnyvale, CA (US); Krishna Prasad Tallapaneni, Ontario (CA); Andrey A. Smirnov, Thornton, CO (US)

(73) Assignee: Oracle America, Inc., Redwood City, CA (US)

( * ) Notice: Subject to any disclaimer, the term of this patent is extended or adjusted under 35 U.S.C. 154(b) by 956 days.

(21) Appl. No.: 12/408,170

(22) Filed: Mar. 20, 2009

(65) Prior Publication Data

US 2010/0241722 A1  Sep. 23, 2010

(51) Int. Cl.
 *G06F 15/16* (2006.01)
(52) U.S. Cl.
 USPC .............................................. 709/207; 726/5
(58) Field of Classification Search
 CPC ........................ H04L 67/025; H04L 63/0807
 USPC .............................................. 709/207; 726/5
 See application file for complete search history.

(56) References Cited

U.S. PATENT DOCUMENTS

| 6,633,835 | B1* | 10/2003 | Moran et al. ............... 702/190 |
| 6,940,813 | B2* | 9/2005 | Ruutu ........................... 370/231 |
| 2005/0060427 | A1* | 3/2005 | Phillips et al. ............... 709/238 |
| 2006/0140121 | A1* | 6/2006 | Kakani et al. ............... 370/235 |

* cited by examiner

*Primary Examiner* — Wing F Chan
*Assistant Examiner* — David X Yi
(74) *Attorney, Agent, or Firm* — Osha Liang LLP (57) ABSTRACT

A method for transporting telemetry data involves receiving a request from a client in a first network. The client is registered with a data transport service executing in a second network. The request includes an authentication credential for the client, a message including telemetry data, and a message priority. The method further involves authenticating the request using the authentication credential. The method further involves parsing the request to obtain and subsequently execute a command for storing the message in a physical queue of the second network. The physical queue is associated with a back-end service executing in the second network. A virtual queue maintains entries for messages stored in the physical queue that were sent from the first network to the second network. Another virtual queue maintains entries for messages stored in the physical queue that were sent from the second network to the first network.

17 Claims, 6 Drawing Sheets

METHOD AND SYSTEM FOR TRANSPORTING TELEMETRY DATA ACROSS A NETWORK

BACKGROUND

Network data centers house a collection of databases, file servers, application servers, and other components to efficiently provide information technology services to a host of remote clients. As such, a variety of remotely-executing client applications and services routinely send requests to and receive responses from the centralized network of the data center. To ensure a suitable quality of service, data centers monitor client-side components as well as the components that are localized to the data center. To that end, data centers are interested in receiving telemetry data pertaining to the measurement and reporting of client-side operations.

SUMMARY

In general, in one aspect, the invention relates to a method for transporting telemetry data across a network. The method includes receiving a request from a first client application executing on a first client operatively connected to a first network, where the first client is registered with a data transport service. The data transport service is executing on a first physical node operatively connected to a second network. The request includes an authentication credential for the first client, a message comprising telemetry data, and a message priority for the message. The method further includes authenticating the request using the authentication credential. The method further includes parsing the request to obtain a command for storing the message in a physical queue associated with a back-end service. The physical queue is located in a message repository operatively connected to the second network. The back-end service is executing on a second physical node operatively connected to the second network. The method further includes storing the message in the physical queue. The method further includes storing an entry for the message in a first virtual queue, where the first virtual queue is associated with the physical queue and the back-end service. The first virtual queue includes entries for messages received from the first client application. The entry comprises the message priority. A second virtual queue is also associated with the physical queue and the back-end service. The second virtual queue includes entries for messages received from a second client application executing on a second client operatively connected to the second network. The second client is registered with the data transport service. The second client application is associated with the back-end service.

In general, in one aspect, the invention relates to a system for transporting telemetry data across a network. The system includes a first client operatively connected to a first network. The client hosts a first client application which is configured to send a request to a data transport service executing on a first physical node operatively connected to a second network, where the first request comprises an authentication credential for the first client, a message comprising telemetry data, and a message priority for the message. The first client is registered with the data transport service. The system further includes the data transport service executing on the first physical node operatively connected to the second network. The data transport service includes a physical queue, where the physical queue is associated with a back-end service executing on a second physical node operatively connected to the second network. The data transport service further includes a first virtual queue, where the first virtual queue is associated with the physical queue and the back-end service, and where the first virtual queue comprises entries for messages received from the first client application. The data transport service further includes a second virtual queue, where the second virtual queue is associated with the physical queue and the back-end service. The second virtual queue includes entries for messages received from a second client application executing on a second client operatively connected to the second network. The second client is registered with the data transport service and associated with the back-end service. The data transport service is configured to receive the request from the first client application. The data transport service is further configured to authenticate the request using the authentication credential. The data transport service is further configured to parse the request to obtain a command for storing the message in the physical queue. The data transport service is further configured to store the message in the physical queue. The data transport service is further configured to store an entry for the message in the first virtual queue, where the entry comprises the message priority. The system further includes the back-end service executing on the second physical node operatively connected to the second network.

In general, in one aspect, the invention relates to a computer-readable storage medium comprising executable instructions for transporting telemetry data across a network, wherein executable instructions comprise instructions: receive a first request from a first client application executing on a first client operatively connected to a first network, wherein the first client is registered with a data transport service executing on a first physical node operatively connected to a second network, and wherein the first request comprises a first authentication credential for the first client, a first message comprising telemetry data, and a first message priority for the first message; authenticate the first request using the first authentication credential; parse the first request to obtain a first command for storing the first message in a physical queue associated with a back-end service, wherein the physical queue is stored in a message repository operatively connected to the second network, and wherein the back-end service is executing on a second physical node operatively connected to the second network; store the first message in the physical queue; and store a first entry for the first message in a first virtual queue, wherein the first virtual queue is associated with the physical queue and the back-end service, wherein the first virtual queue comprises entries for messages received from the first client application, and wherein the first entry comprises the first message priority, wherein a second virtual queue is associated with the physical queue and the back-end service, wherein the second virtual queue comprises entries for messages received from a second client application executing on a second client operatively connected to the second network, wherein the second client is registered with the data transport service, and wherein the second client application is associated with the back-end service, wherein the first virtual queue only comprises messages received from clients located in a first geographic location, wherein the second virtual queue only comprises messages received from clients located in a second geographic location wherein the first client is located in the first geographic location, and wherein the first request and the second request are Hypertext Transport Protocol (HTTP) requests.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for transporting telemetry data across a network. More specifically, embodiments of the invention are directed to providing two-way communication and message queuing functionalities between clients in separate networks. Further, embodiments of the invention relate to a secure, authenticated, and scalable method for transporting telemetry data across a network. In one or more embodiments of the invention, the invention may be implemented using a priority First-In First-Out (FIFO) queue, provides reliable message delivery, and support binary data, text data, other data formats, or any combination thereof. Further, in one or more embodiments of the invention, messages of any size are capable of being delivered.

Figure 1:
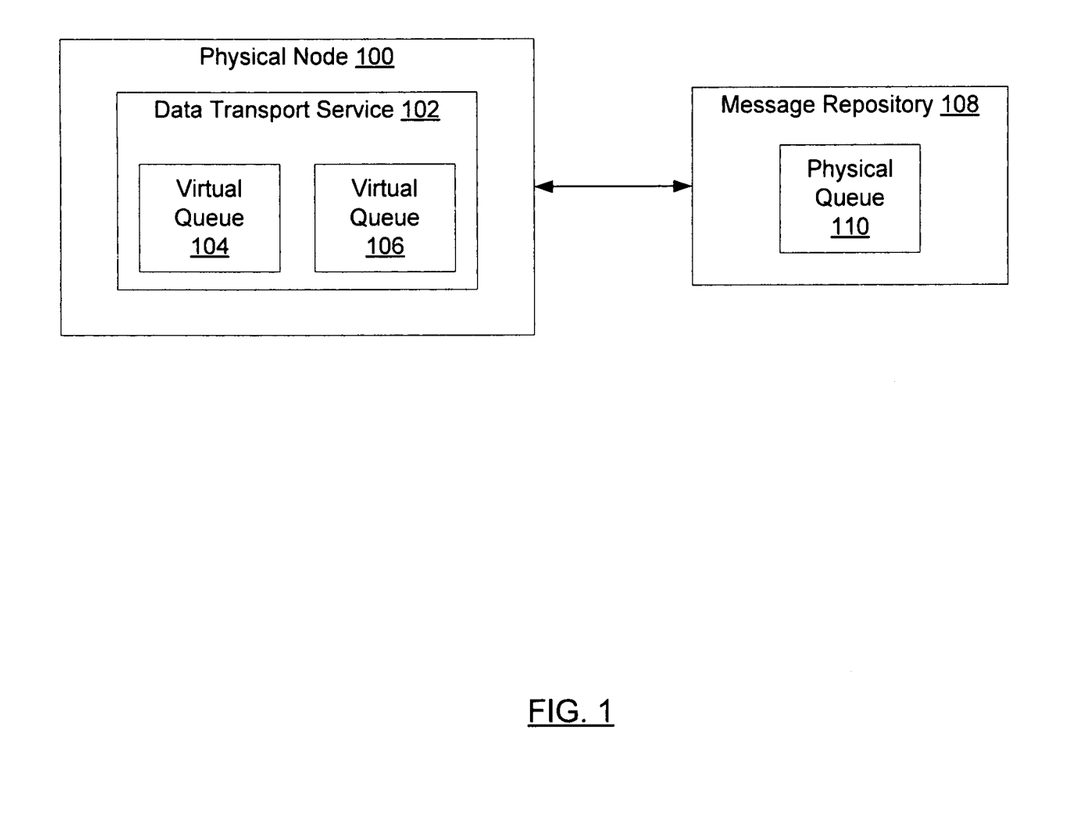
FIG. 1 shows a system in accordance with one or more embodiments of the invention.

FIG. 1 shows a system in accordance with one or more embodiments of the invention. In one or more embodiments of the invention, a data transport service (102) is configured to execute on a physical node (100) operatively connected to a network (not shown). In one or more embodiments of the invention, the data transport service (102) is configured to receive a request for registering a client (not shown). The data transport service (102) is further configured to respond to the request for registering a client by sending a response including at least one authentication credential. The data transport service (102) is configured to obtain at least one authentication credential from a registration service (not shown).

In one or more embodiments of the invention, the data transport service (102) is configured to store a message received from one or more clients (not shown). The message may include telemetry data pertaining to measurement or logging information associated with a client. For example, telemetry data may include, but is not limited to, client configuration information or a logging of hardware fault events. Further, the telemetry data may be in binary or text format. In one or more embodiments of the invention, the message is designated, as a function of the type of the telemetry data in the message, for a particular back-end service (not shown) configured to process that type of telemetry data. Though not shown, the back-end service may be a service executing in a data center that is configured to process or consume telemetry data of a specified type. For example, the back-end service may be configured to specifically process telemetry data pertaining to hardware fault events.

Accordingly, in one or more embodiments of the invention, the data transport service (102) is configured to receive a request for storing a message. The message to be stored is sent along with the request for storing the message. The data transport service (102) is further configured to provide the message to a message repository (108) for storage.

Further, in one or more embodiments of the invention, the data transport service (102) is configured to receive a request for retrieving a stored message. The data transport service (102) may be further configured to retrieve the stored message from the message repository (108) and subsequently provide the message in a response to the request.

In one or more embodiments of the invention, the message repository (108) is configured to receive and subsequently store a message. Specifically, the message repository (108) includes a physical queue (110) in association with a back-end service (not shown) for purposes of storing the message. Further, in one or more embodiments of the invention, the message repository (108) is configured to retrieve a stored message from the physical queue (110).

In one or more embodiments of the invention, the data transport service (102) includes at least two virtual queues (104, 106). In general, virtual queues (104, 106) allows for the filtering of messages stored in the physical queue (110) based on some defined attribute. As such, in one or more embodiments of the invention, an entry in the virtual queue (104, 106) correspond to a message stored in the physical queue (110) of the message repository (108). In one or more embodiments of the invention, a virtual queue (104, 106) is implemented using a container-type data structure that is capable of manipulation via insert entry and delete entry operations. Further, the entries stored in the virtual queue (104, 106) may be maintained in a sorted order according to one or more attributes defined by a data structure definition used to implement a virtual queue entry.

In one or more embodiments of the invention, a virtual queue (104, 106) is associated with one or more particular requirements which the entries stored in the virtual queue must satisfy. For example, the origination of a message may be an attribute to filter messages stored in a physical queue (110) into one or more virtual queues (104, 106). As such, in one or more embodiments of the invention, a requirement of a first virtual queue (104) is that a message corresponding with a virtual queue entry is a message that originated in a network different than the network upon which the data transport service (102) is hosted (i.e., the network upon which the physical node (100) is operatively connected). Further, in one or more embodiments of the invention, a requirement of a second virtual queue (106) is that the message corresponding with virtual queue entry is a message that originated in the same network as the network upon which the data transport service (102) is hosted. Those skilled in the art will appreciate that virtual queues may be configured to impose various other requirements upon a message for which the virtual queue stores an entry. For example, in one or more embodiments of the invention, a virtual queue may further require a message to originate from a particular geographic location. As such, a first virtual queue may maintain messages originating from clients in, for example, North America, whereas a second virtual queue may maintain messages originating from clients in, for example, Europe. In another example, in accordance with one or more embodiments of the invention, a virtual queue may further require a message to originate from a particular client.

Figure 2:
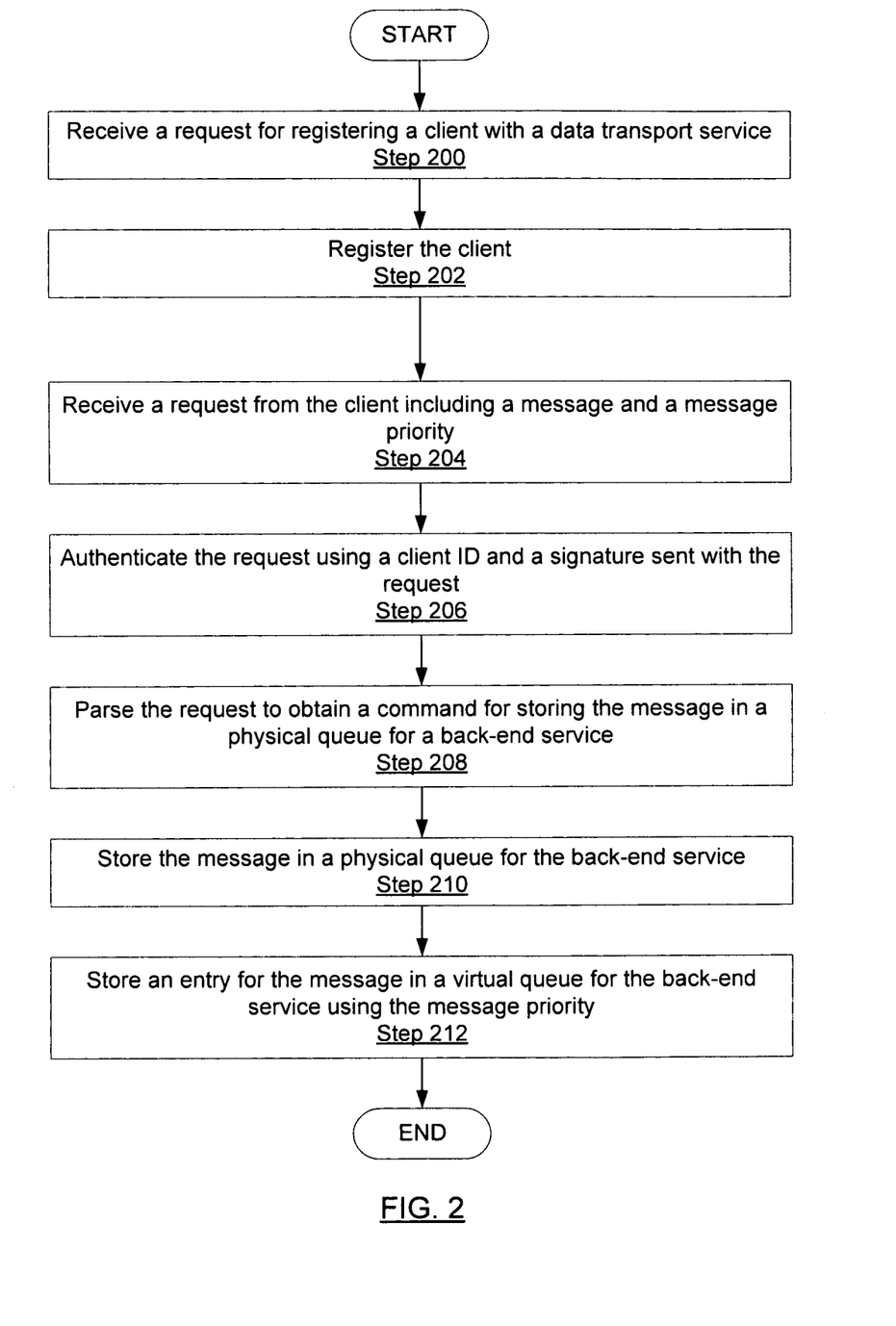
FIGS. 2 and 3 show a flowchart in accordance with one or more embodiments of the invention.

FIG. 2 shows a flowchart in accordance with one or more embodiments of the invention. The process shown in FIG. 2 may be used, for example, to store a message with the data transport service. While the various steps in FIG. 2 are presented and described sequentially, one should appreciate that some or all of the steps may be executed in different orders, may be combined or omitted, and some or all of the steps may be executed in parallel. In addition, steps have been omitted to simplify the presentation.

In Step 200, a request is received for registering a client with the data transport service. In one or more embodiments of the invention, registration of the client with the data transport service is a prerequisite for that client to store a message using the data transport service.

In Step 202, the client is registered with the data transport service. In one or more embodiments of the invention, a separate registration service handles the registration on behalf of the data transport service. In one or more embodiments of the invention, one or more authentication tokens are obtained from the registration service and provided to the client as a result of the client being successfully registered. The authentication tokens may include, but are not limited to, a unique client identifier issued by the registration service for the client and a public key corresponding to a private key maintained by the data transport service and/or the registration service.

In one or more embodiments of the invention, the registration service creates and maintains an entry, as defined by a data structure definition, that includes the authentication tokens issued to the client upon registration. Further, the registration service may maintain the entry for the client in a table data structure that uses unique client identifiers as a table index.

In Step 204, a request for storing a message is received from the registered client. In one or more embodiments of the invention, the request includes at least one authentication credential for the client, a message including telemetry data, and a message priority for the message. In one or more embodiments of the invention, the at least one authentication credential may include, but is not limited to, a unique client identifier and a client signature generated using the public key provided to the client at the time of registration (see Step 202). In one or more embodiments of the invention, the message priority is a priority for the message as specified by the client.

In Step 206, the request for storing the message is authenticated. In one or more embodiments of the invention, the unique client identifier and client signature (described above in Step 204) are used in authenticating the message. In one or more embodiments of the invention, the unique client identifier provided with the request should match with an entry for a registered client as maintained by the registration service. The client signature generated using a public key issued to the client may be validated using a corresponding private key maintained by the registration service.

In Step 208, the request is parsed to obtain a command for storing the message in a physical queue associated with a specified back-end service. In Step 210, the message provided with the request is stored in the physical queue in accordance with the obtained command (from Step 208). In one or more embodiments of the invention, the message is stored as a file on a computer-readable storage medium.

In one or more embodiments of the invention, the process of receiving a request, authenticating the request, and parsing the request (i.e., Steps 204, 206, and 208) is further subject to an authorization mechanism. As a function of a registration with the data transport service, a client is granted one or more privileges. For example, a first client may only have a "POST" privilege thereby allowing the client to store messages in the message repository. A second client may only have "GET" and "DELETE" privileges thereby allowing the client to retrieve and delete messages that are stored in the message repository. A third client may have all three privileges ("POST", "GET", "DELETE"). Accordingly, in one or more embodiments of the invention, authorization allows the data transport service to control the transfer of data across a network through the granting of particular privileges to clients.

In Step 212, an entry is created for the message in a virtual queue using the message priority. In one or more embodiments of the invention, the virtual queue is associated with the specified back-end service and the corresponding physical queue (as described in relation to FIG. 1). Further, in one or more embodiments of the invention, the entries of a virtual queue may be maintained in an ordering according to message priorities. As such, the entry created for the message is positioned in the virtual queue as a function of the message priority specified in the request to store the message. Those skilled in the art will appreciate that various implementations of the invention may not include virtual queues and, in such cases, Step 212 is not performed.

Figure 3:
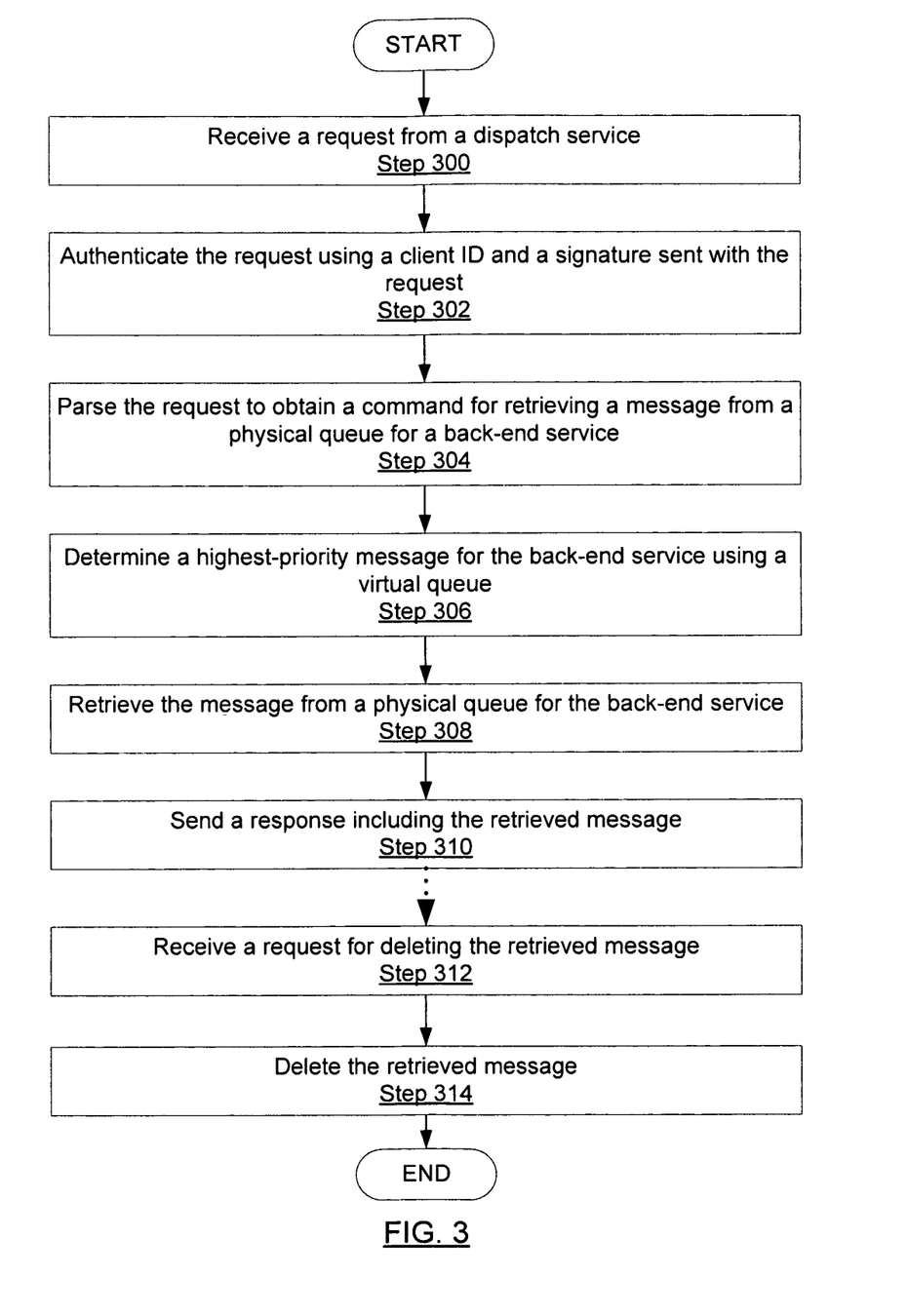

FIG. 3 shows a flowchart in accordance with one or more embodiments of the invention. The process shown in FIG. 3 may be used, for example, to retrieve a message stored with the data transport service. While the various steps in FIG. 3 are presented and described sequentially, one should appreciate that some or all of the steps may be executed in different orders, may be combined or omitted, and some or all of the steps may be executed in parallel. In addition, steps have been omitted to simplify the presentation.

In Step 300, a request for retrieving a message is received from a dispatch service. In one or more embodiments of the invention, registration with the data transport service of the client executing the dispatch service is a prerequisite for the client to receive a message retrieved using the data transport service.

In Step 302, the request for retrieving the message is authenticated. In one or more embodiments of the invention, the mechanism by which this is accomplished is similar to that described above with regards to FIG. 2 and Step 206.

In Step 304, the request is parsed to obtain a command for retrieving the message from a physical queue associated with a specified back-end service (as described in relation to FIG. 1).

In performing the command obtained in Step 304, a highest priority message stored in a physical queue is determined using a virtual queue associated with the physical queue in Step 306. In one or more embodiments of the invention, the determination of the highest priority message is achieved using any one of well-known sort functions to sort the virtual queue with respect to the message priority defined for each entry.

Alternatively, in one or more other embodiments of the invention, a sorting of the virtual queue is not necessary if the entries of the virtual queue are maintained in an order according to the message priority. As such, if the entries of the virtual queue are maintained in an order of ascending message priority, then the highest priority message corresponds to the last entry in the virtual queue. However, if the entries of the virtual queue are maintained in an order of descending message priority, then the highest priority message corresponds to the first entry in the virtual queue. Those skilled in the art will appreciate that if the implementation of the invention does not include a virtual queue(s), then the portions of Step 306 related to virtual queue(s) are not performed.

Further, those skilled in the art will appreciate that criteria other than message priority may be used for determining a message stored in a physical queue (i.e., Step 306). For example, in one or more embodiments of the invention, the client may determine whether a message that is being sent is assigned a message priority. Accordingly, determination of messages stored in the physical queue may be made using an assigned message priority which may override the default First In First Out (FIFO) scheme.

Returning to FIG. 3, the highest priority message determined in Step 306 is retrieved from the physical queue in Step 308. In Step 310, a response to the request for retrieving a message is sent using the message retrieved in Step 308. In one or more embodiments of the invention, the response is sent to the dispatch service that originated the request for retrieving the message.

In Step 312, a new request for deleting the retrieved message of Step 308 is received. In Step 314, the retrieved message of Step 308 is deleted from the physical queue. In addition, in one or more embodiments of the invention, the entry in the virtual queue that corresponds with the message is also deleted (if virtual queues are used in the implementation of the invention). In one or more embodiments of the invention, the message deletion mechanism (i.e., Steps 312 and 314) in the data transport service is contingent on the success of a message retrieval (i.e., Step 308) for the same message. Accordingly, the message is not deleted until the message is successfully retrieved. In one embodiment of the invention, the aforementioned message deletion mechanism supports the reliable message delivery.

As described with regards to FIGS. 2 and 3, one or more embodiments of the invention require the sending of a request from one networked entity to another networked entity. In one or more embodiments of the invention, requests are sent using Hypertext Transport Protocol (HTTP). Further, in one or more embodiments of the invention, requests sent over HTTP are further secured using an encrypted Secure Sockets Layer (SSL) or Transport Layer Security (TLS).

In one or more embodiments of the invention, the functionalities of the data transport service are embodied as resources in a Representational State Transfer (REST) architecture. Further, in a REST architecture, RESTful resources are identifiable using Uniform Resource Locators (URLs). For example, in the URL https://dts-server.domain/v1/queue/telemetry-type1/Americas, "telemetry-type 1" specifies a particular physical queue and "Americas" specifies a particular virtual queue. Similarly, in the URL https://dts-server.domain/v1/queue/telemetry-type1/message/1, the last parameter "1" serves as a unique message identifier for specifying a particular message stored in the physical queue "telemetry-type1."

Accordingly, a client access a RESTful resource by posting a HTTP command to the URL associated with the resource. For example, with regards to the URL https://dts-server.domain/v1/queue/telemetry-type1/, a client can issue a HTTP POST request to the URL for purposes of storing a message in the physical queue "telemetry-type1." As a result of processing the request, the message provided with the HTTP POST request is stored with the data transport service and associated with a unique message identifier. For purposes of continuing this example, assume the message identifier issued for the newly-stored message is 3. Subsequently, the message identifier can be specified when making HTTP GET and HTTP DELETE requests to access the stored message. As such, by posting a HTTP GET request to URL https://dts-server.domain/v1/queue/telemetry-type1/message/3, the specification of the parameter "3" serves to identify the particular message for purposes of retrieving the message. Similarly, a HTTP DELETE request posted to the same exact URL specifies the message for purposes of deleting the message. Alternatively, the client may also post a HTTP POST request to the URL https://dts-server.domain/v1/queue/telemetry-type1/pop to get the next available message from the physical queue "telemetry-type1." In such an instance, according to one or more embodiments of the invention, the data transport service will process the request appropriately in accordance with a FIFO policy or a message priority policy contingent upon the existence of any prioritized messages stored in physical queue "telemetry-type1."

Figure 4:
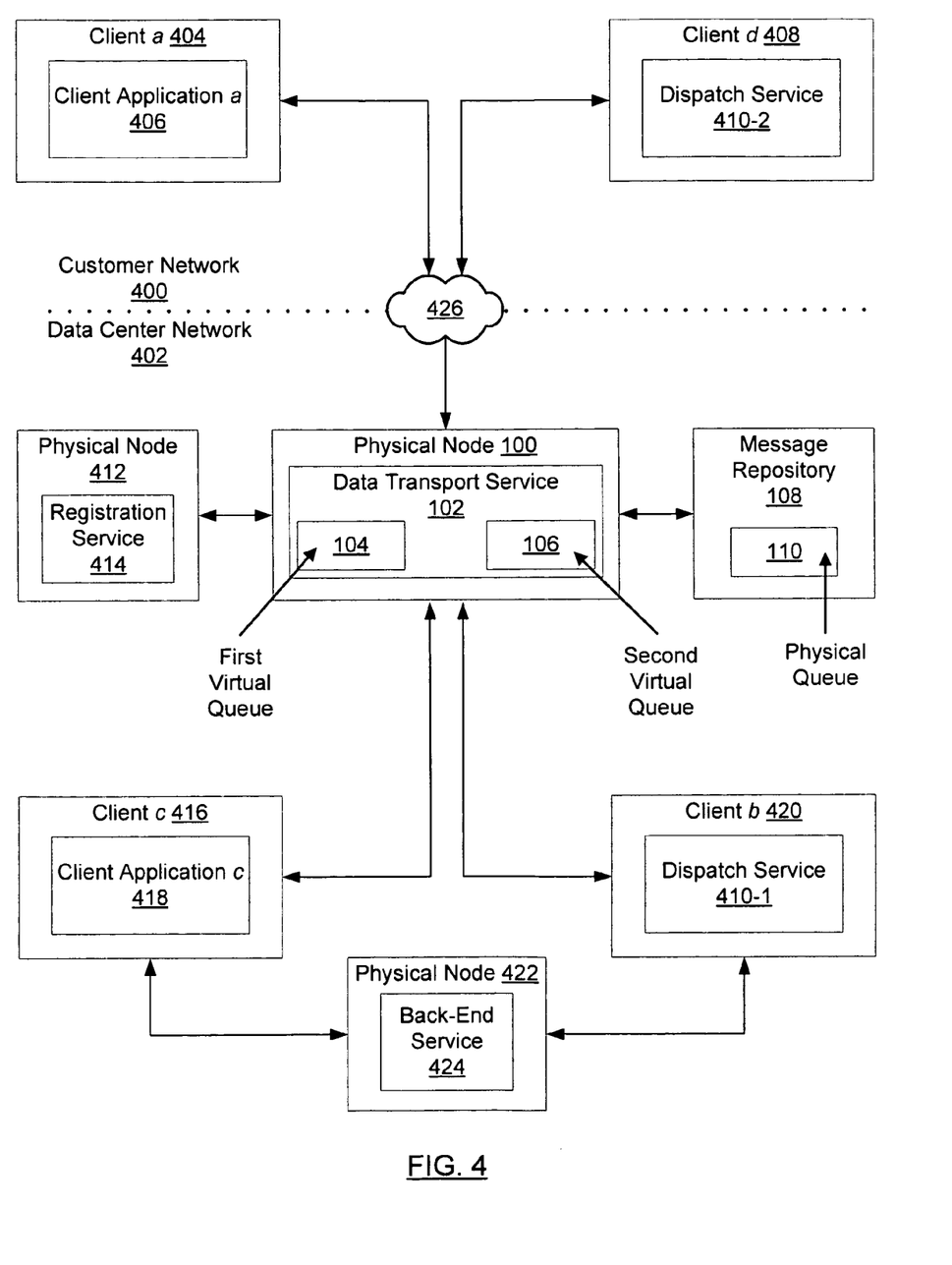
FIGS. 4 and 5 show a system in accordance with one or more embodiments of the invention.

FIG. 4 shows a system in accordance with one or more embodiments of the invention. FIG. 4 includes a customer network (400) and a data center network (402). The customer network (400) and data center network (402) are operatively connected (426) such that data may be transmitted over a physical and/or a wireless connection.

The customer network (400) includes two clients (404, 408). Client a (404) hosts a Client Application a (406). Client d (408) hosts an instance of a dispatch service (410-2).

The data center network (402) includes a physical node (100) hosting a data transport service (102). The data center network (402) further includes a message repository (108) and a physical node (412) hosting a registration service (414). These aforementioned components (100, 102, 108, 412, 414) may be characterized as sitting in a first tier of the data center network (402). Further, the data transport service (102) may effectively serve as a proxy for communications between the customer network (400) and a second tier of the data center network (402).

The second tier of the data center network (402) includes two clients (416, 420). Client c (416) hosts a Client Application c (418). Client b (420) hosts an instance of the dispatch service (410-1). The second tier of the data center network (402) further includes a physical node (422) hosting a back-end service (424).

For purposes of describing a use of the data transport service in transporting telemetry data between networked components, assume that newly-deployed Client Application a (406) situated in the customer network (400) keeps a log of hardware fault events. Further, assume that the back-end service (424) situated in the data center network (402) is configured to analyze such a log. A sequence of steps in accordance with one or more embodiments of the invention enables the sending of the log information from the client (404) in the customer network (400) to the service (424) in the data center network (402).

Registration

Initially, the newly-deployed Client Application a (406) is required to register Client a (404) with the data transport service (102) situated in the first tier of the data center network (402). As such, the Client Application a (406) sends a request for registration to the data transport service (102). The data transport service (102), in turn, requests one or more authentication tokens from the registration service (414). In processing the request from the data transport service (102), the registration service (414) determines a unique client identifier and a public key for Client a (404). Having obtained the described authentication tokens from the registration service (414), the data transport service (102) provides a response to the request for registration that includes the authentication tokens to Client a (404). Client a (404) is now registered with the data transport service (102) and capable of sending telemetry data using the data transport service in a secure manner.

Storing a Message

With registration complete, Client Application a (406) is now prepared to transmit the telemetry log data to the data transport service (102) via a request. As such, Client Application a (406) sends a request for storing a message including the telemetry log data with the data transport service (102). The request further includes the unique client identifier issued at the time of registration and a client signature generated using the issued public key, which are presented as authentication credentials on behalf of Client a (404). The request further includes a message priority for the message as determined by Client Application a (404).

In receiving the request, the data transport service (102) first authenticates the request. To authenticate the request, the data transport service (102) uses the unique client identifier to obtain a private key corresponding with the issued public key from the registration service (414). Using the private key, the data transport service (102) validates the client signature.

Having authenticated the request, the data transport service (102) next parses the request to determine a command. In this instance, the command is a command for storing the provided message. Accordingly, the message is provided by the data transport service (102) to the message repository (108) where the message is stored in a physical queue (110). Further, a corresponding entry is entered into a virtual queue (104) of the data transport service (102) that is maintained to store entries for messages originating from clients in the customer network (400). As described in relation to FIG. 2, the message priority specified for the message by Client Application a (404) is used to place the entry for the message into the virtual queue (104).

Retrieving a Message

Assuming it is registered and therefore has the proper credentials (as discussed above), the dispatch service (410-1) hosted on Client b (420) is configured to retrieve a stored message using the data transport service (102). Specifically, in one embodiment of the invention, the dispatch service (410-1) sends a request for retrieving a stored message to the data transport service (102). The request includes authentication credentials such as a unique client identifier for Client b (420) and a client-generated signature using a public key issued for Client b (420) at the time of its registration with the data transport service (102).

Having received the request for retrieving a message, the data transport service (102) authenticates the request in a manner similar to that discussed above with respect to the message received from client application a (406). The data transport service then proceeds to parse the request to determine a command. In this instance, the command is a command for retrieving a stored message. Accordingly, the data transport service (102) uses the entries in the virtual queue (104) to determine the message originating from the customer network (400) that has the highest message priority. The data transport service (102) then obtains the message as determined from the physical queue and provides it to the dispatch service (410-1) in a response. The dispatch service (410-1) then, in turn, provides the retrieved message containing the telemetry data to the appropriate back-end service (424) for processing.

Figure 5:
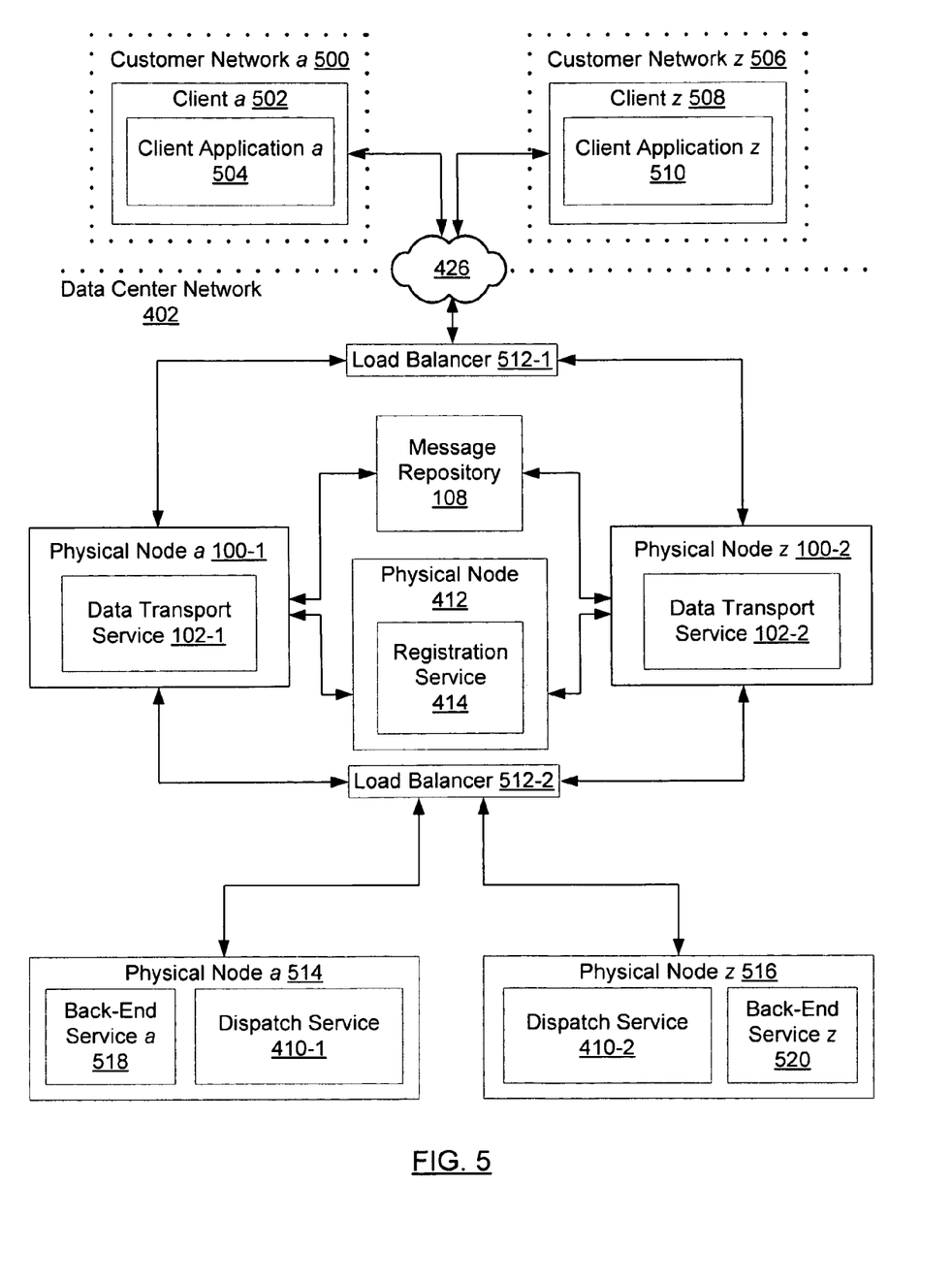

The above-described steps of client registration, message storage, message retrieval, and message processing illustrate a logical interconnectivity between the described components. For example, on the client side, Client Application a (406) is specifically configured to send via request a message that includes a particular type of telemetry data. The particular type of telemetry data is specifically what the back-end service (424) is configured to process. The data transport service (102) and the message repository (110), situated in between Client Application a (406) and the back-end service (424), are specifically configured to categorically maintain messages in a distinct physical queue (110) and a virtual queue (104, 106) based on whether messages contain telemetry data specifically designated for processing by a back-end service (424) for which those queue structures (110, 104, 106) are associated with. FIG. 5 illustrates, in part, how an embodiment of the invention may be configured when there is more than one operative back-end service.

Deleting a Message

Returning to FIG. 4, the data transport service (102) is further configured to receive a request for deleting a stored message. In such an instance, the request may originate from a dispatch service (410-1) that has, as described above, retrieved the message with an earlier request-response exchange for a client (420). As such, the dispatch service (410-1) may send a request for message deletion to the data transport service (102) once the telemetry data included in the message has been processed and consumed by the back-end service (424). The request includes authentication credentials such as a unique client identifier and a client-generated signature of client b (420).

In receiving the request for message deletion from the dispatch service (410-1), the data transport service (102), authenticates the request as a function of the authentication credentials provided with the request. Once the request is authenticated, the data transport service (102) determines a message for deletion based upon the highest message priority among the entries in the virtual queue (104). Once a message is determined for deletion using the virtual queue (104), the data transport service (102) requests the deletion of the message from the appropriate physical queue (100) in the message repository (108). The corresponding entry for the message in the virtual queue is likewise deleted.

The deletion mechanism, as described, is contingent on whether the back-end service (424) has in fact received the telemetry data. As such, the message persists in the message repository (108) until the dispatch service (410-1) sends the request for deletion. This further accounts for the possibility that the back-end service may fail to process the telemetry data. In such a case, the persistence of the message both in the physical queue (110) of the message repository (108) and the virtual queue (104) in the data transport service (102) allow for at least a subsequent attempt.

Two-Way Communication

Similar to the manner in which a telemetry message is transmitted from Client a (404) in the customer network (400) to Client b (420) in the second tier of the data center network (402), the data transport service includes functionality to enable communication originating from a client in the second tier of the data center network (402) to a client situated in the customer network (400). For example, Client Application c (418) is configured, similar to Client Application a (406), to send a request including a message for storage to the data transport service (102). Further, the instance of the dispatch service (410-2) hosted on Client d (408) is configured, similar to the dispatch service (410-1) hosted on Client b (420), to send a request for retrieving a stored message from the data transport service (102). In addition, the data transport service (102) maintains a second virtual queue (106) which enables the priority determination and ordering of messages originating from the second tier in the data center network (402).

Scalability

FIG. 5 shows a system in accordance with one or more embodiments of the invention. The mechanism of transporting telemetry data in the embodiment of the invention depicted in FIG. 5 is similar the embodiment of the invention depicted in FIG. 4 and discussed above. However, FIG. 5 depicts embodiments of the invention that allow for more than one operative back-end service (518, 520) configured to process telemetry data originating from clients (502, 508) in various customer networks (500, 506).

Specifically, FIG. 5 includes two distinct customer networks (500, 506). Customer Network a (500) includes a Client a (502) configured to host Client Application a (504). Customer Network z (506) includes a Client z (508) configured to host Client Application z (510). Further, FIG. 5 includes a data center network (402). The customer networks (500, 506) and the data center network (402) are operatively connected (426) such that data may be transmitted over a physical and/or a wireless connection. The data center network (402) may be described as having a first tier and a second tier. The first tier of the data center network (402) includes a Physical Node a (100-1) hosting a first instance of a data transport service (102-1). The first tier of the data center network further includes a Physical Node z (100-2) hosting a second instance of the data transport service (102-2). In addition, a message repository (108) and a registration service (414) are further included in the first tier of the data center network (402). A first load balancer (512-1) is provided to route requests originating from either customer network (500, 506) to one of the instances of the data transport service (102-1, 102-2). A second load balancer (512-2) is provided to route requests originating from the second tier of the data center network (402) to one of the instances of the data transport service (102-1, 102-2).

The second tier of the data center network (402) includes two physical nodes (100-1, 100-2) which account for the operation of two different back-end services (518, 520). Physical Node a (100-1) hosts a Back-End Service a (518) and a first instance of a dispatch service (410-1). Physical Node z (100-2) hosts a Back-End Service z (520) and a second instance of the dispatch service (410-2).

Customer Network a (500), Client a (502), Client Application a (504), Physical Node a (100-1), the first instance of the data transport service (102-1) hosted on Physical Node a (100-1), Physical Node a (100-2), Back-End Service a (518), and the first instance of the dispatch service (102-1) hosted on Physical Node a (100-1) are all logically related in at least the manner described with relation to FIG. 4. In particular, Client Application a (504) is configured to send a request with a message including telemetry data of a certain classification. Further, Back-End Service a (518) is configured to process telemetry data specifically of that same classification. In addition, the data transport service (102-1) and the message repository (108) are specifically configured to maintain messages in a distinct physical queue (not shown) and a virtual queue (not shown) based on whether the messages includes telemetry data that is specifically designated for processing by the corresponding back-end service (518). For purposes of clarity, these components are collectively be referred to as Telemetry Network a.

Customer Network z (506), Client z (508), Client Application z (510), Physical Node z (516), the second instance of the data transport service (102-2) hosted on Physical Node z (516), Physical Node z (516), Back-End Service z (520), and the second instance of the dispatch service (410-2) hosted on Physical Node z (516) are interrelated with each other in at least the same manner as Telemetry Network a. For purposes of clarity, these components are collectively be referred to as Telemetry Network z.

An examination of Telemetry Network a and Telemetry Network z reveals two common functional components of importance: the registration service (414) and the message repository (108). The registration service (414) provides client registration functionality in service of clients in both telemetry networks. Similarly, the message repository (108) provides physical message storage functionality in service of clients in both telemetry networks. However, those skilled in the art will appreciate that Telemetry Network a and Telemetry Network z are otherwise functionally independent of each other apart from those two shared functional components (414, 108). For example, the two back-end services (518, 520) executing in the second tier of the data center network (402) are configured to process two distinct types of telemetry data. The two distinct types of telemetry data originate from two distinct clients (502, 508) operatively connected to their respective customer networks (500, 506). In turn, the clients (502, 508) each host respective client applications (504, 510) that are configured to generate requests for transporting telemetry data associated with the clients (502, 508).

While both clients transmit requests for storing messages that include telemetry data to the same first tier in the data center network (402), requests are categorically routed to one physical node (100-1) or the other (100-2) as a function of the type of telemetry data and the particular back-end service (518, 520) configured to process that type of telemetry data. This is accomplished through the specification of physical queue names as invoked in a request directed by a RESTful resource URL. Accordingly, in the instances of both Telemetry Network a and Telemetry Network z, there is a definite logical association between a customer network client that generates telemetry data, the instance of the data transport service used to process a client-generated request transporting that client's telemetry data, and the back-end service that eventually processes that client's telemetry data. However, in part because of the virtual queuing feature of the data transport service, there is no logical overlap between the telemetry networks even when physical messages originating from both of the customer networks (500, 506) are stored in the same message repository (108). As such, those skilled in the art will further appreciate that a data center network configuration such as the one described in embodiments of the present invention enables scalability on an order that allows for various back-end services and clients connected through a common data transport service infrastructure situated in a first tier of a data center network.

Figure 6:
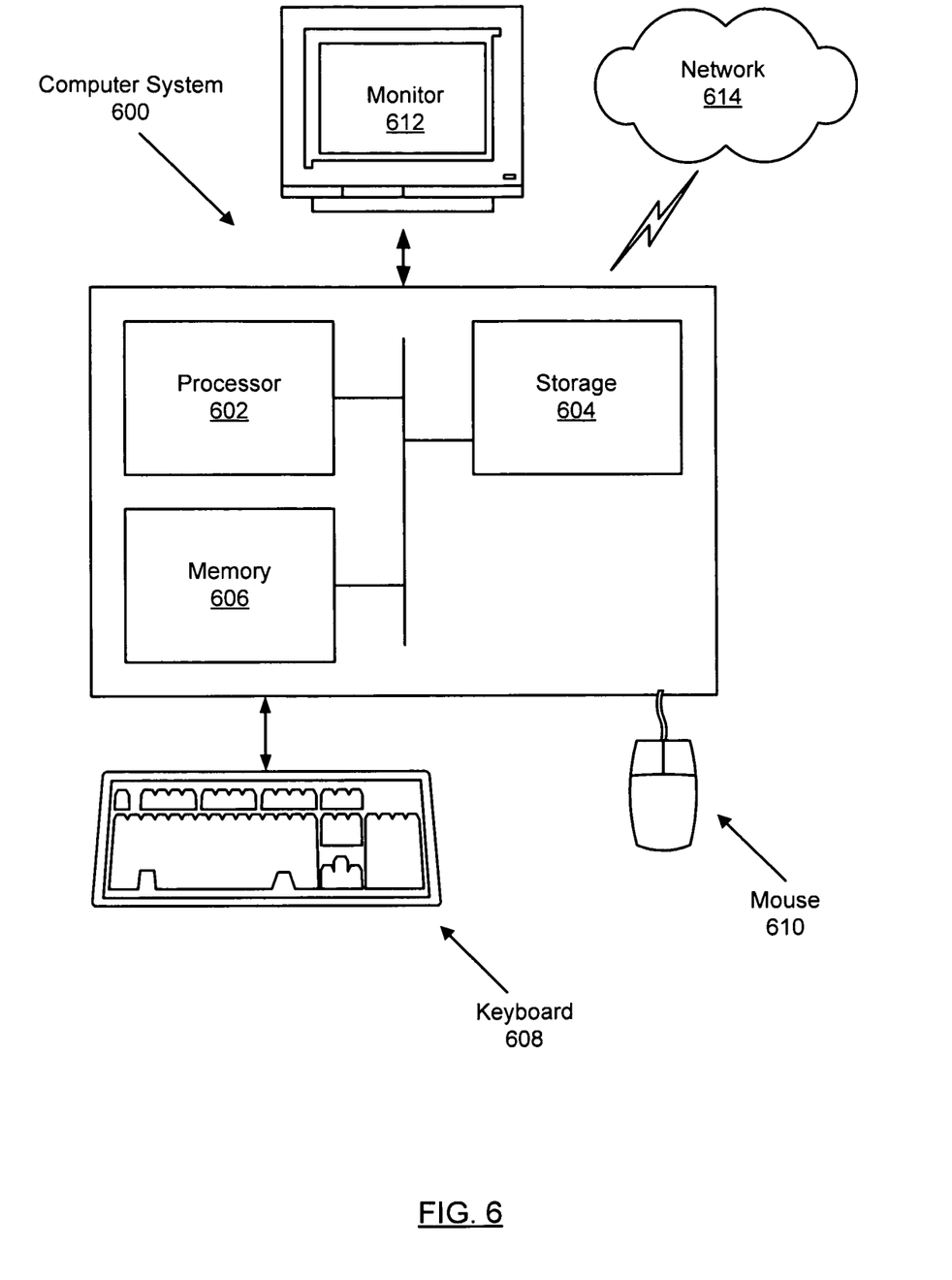
FIG. 6 shows a computer system in accordance with one or more embodiments of the invention.

Embodiments of the invention may be implemented on virtually any type of computer regardless of the platform being used. For example, as shown in FIG. 6, a computer system (600) includes one or more processors (602), associated memory (606) (e.g., random access memory (RAM), cache memory, flash memory, etc.), a storage device (604) (e.g., a hard disk, an optical drive such as a compact disk drive or digital video disk (DVD) drive, a flash memory stick, etc.), and numerous other elements and functionalities typical of today's computers (not shown). The computer (600) may also include input means, such as a keyboard (608), a mouse (610), or a microphone (not shown). Further, the computer (600) may include output means, such as a monitor (612) (e.g., a liquid crystal display (LCD), a plasma display, or cathode ray tube (CRT) monitor). The computer system (600) may be connected to a network (614) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, those skilled in the art will appreciate that one or more elements of the aforementioned computer system (600) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other medium or device capable of storing software instructions in a computer readable format.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for transporting telemetry data comprising:
   receiving, from a first client application executing on a first client, a first request comprising a first authentication credential for the first client, a first message comprising a plurality of telemetry data, and a first message priority for the first message;
   identifying a classification of the plurality of telemetry data;
   matching the classification to a back-end service configured to process telemetry data having the classification;
   routing the first request to a first physical node associated with the back-end service;
   authenticating, after routing the first request, the first request using the first authentication credential;
   parsing, after authenticating the first request, the first request to obtain a first command for storing the first message in a physical queue associated with the back-end service, wherein the physical queue comprises a plurality of messages received from the first client application and a plurality of messages received from a second client application executing on a second client;
   storing the first message in the physical queue;
   identifying a first virtual queue corresponding to the physical queue and comprising an entry for each of the plurality of messages received from the first client application,
      wherein the first virtual queue is not a component of the physical queue, and
      wherein the first virtual queue stores only entries corresponding to messages in the physical queue;
   identifying a second virtual queue corresponding to the physical queue and comprising an entry for each of the plurality of messages received from the second client application,
      wherein the second virtual queue is not a component of the physical queue, and
      wherein the second virtual queue stores only entries corresponding to messages in the physical queue;
   storing, in the first virtual queue, a first entry corresponding to the first message, wherein the first entry comprises the first message priority;
   receiving a second request from a first instance of a dispatch service executing on a third client registered with a data transport service executing on the first physical node,
      wherein the first instance of the dispatch service is associated with the back-end service, and
      wherein the second request comprises a second authentication credential for the third client;
   authenticating the second request using the second authentication credential;
   parsing the second request to obtain a second command for retrieving a second message stored in the physical queue;
   identifying the second message using the first virtual queue,
      wherein a second entry for the second message is stored in the first virtual queue, wherein the second entry comprises a second message priority for the second message, and
      wherein the second message priority is the highest message priority of any message priority in the first virtual queue;
   retrieving the second message from the physical queue; and
   sending a first response comprising the second message to the third client.

2. The method of claim 1, wherein the first request and the second request are Hypertext Transport Protocol (HTTP) requests.

3. The method of claim 1, further comprising:
   receiving a third request from the first instance of the dispatch service, wherein the third request comprises the second authentication credential;
   authenticating the third request using the second authentication credential;
   parsing the third request to obtain a third command for deleting the second message;
   deleting the second message from the physical queue; and
   deleting the second entry from the first virtual queue.

4. The method of claim 3, further comprising:
   receiving a fourth request from the second client application, wherein the fourth request comprises a third authentication credential for the second client, a third message, and a third message priority for the third message;
   authenticating the fourth request using the third authentication credential;
   parsing the fourth request to obtain a fourth command for storing the third message in the physical queue;
   storing the third message in the physical queue; and
   storing a third entry for the third message in the second virtual queue, wherein the third entry comprises the third message priority.

5. The method of claim 4, further comprising:
   receiving a fifth request from a second instance of the dispatch service executing on a fourth client,
      wherein the fourth client is registered with the data transport service, and
      wherein the fifth request comprises a fourth authentication credential for the fourth client;
   authenticating the fifth request using the fourth authentication credential;
   parsing the fifth request to obtain a fifth command for retrieving a fourth message stored in the physical queue;

identifying the fourth message using the second virtual queue,
  wherein a fourth entry for the fourth message is stored in the second virtual queue,
  wherein the fourth entry comprises a fourth message priority for the fourth message, and
  wherein the fourth message priority is the highest message priority of any message priority in the second virtual queue;
retrieving the fourth message from the physical queue; and
sending a second response comprising the fourth message to the fourth client.

6. The method of claim 5, further comprising:
receiving a sixth request from the second instance of the dispatch service, wherein the sixth request comprises the fourth authentication credential;
authenticating the sixth request using the fourth authentication credential;
parsing the sixth request to obtain a sixth command for deleting the fourth message;
deleting the fourth message from the physical queue; and
deleting the fourth entry from the second virtual queue.

7. The method of claim 1, wherein the first virtual queue only comprises messages received from clients located in a first geographic location, wherein the second virtual queue only comprises messages received from clients located in a second geographic location, and wherein the first client is located in the first geographic location.

8. The method of claim 1, wherein the authentication credential is selected from the group comprising a unique client identifier and a client-generated signature.

9. A system for transporting telemetry data, comprising:
a first client computing device operatively connected to a first network and hosting a first client application configured to:
  send a first request comprising a first authentication credential of the first client computing device, a first message comprising a plurality of telemetry data, and a first message priority for the first message;
a load balancer configured to:
  identify a classification of the plurality of telemetry data;
  match the classification to a back-end service residing in a first physical node;
  identify a data transport service corresponding to the back-end service;
  route the first request to a data transport service;
a repository comprising:
  a physical queue comprising a plurality of messages received from the first client application and a plurality of messages received from a second client application; and
the data transport service executing on a second physical node, comprising:
  a first virtual queue corresponding to the physical queue and comprising an entry for each of the plurality of messages received from the first client application,
    wherein the first virtual queue is not a component of the physical queue, and
    wherein the first virtual queue stores only entries corresponding to messages in the physical queue; and
  a second virtual queue corresponding to the physical queue and comprising an entry for each of the plurality of messages received from the second client application, wherein the second client application is executing on a second client computing device operatively connected to a second network,
    wherein the second virtual queue is not a component of the physical queue, and
    wherein the second virtual queue stores only entries corresponding to messages in the physical queue;
  wherein the data transport service is configured to:
    receive the first request from the first client application;
    authenticate the first request using the first authentication credential;
    parse the first request to obtain a first command for storing the first message in the physical queue;
    store, based on the command, the first message in the physical queue; and
    store a first entry corresponding to the first message in the first virtual queue, wherein the first entry comprises the first message priority,
a third client operatively connected to the second network,
  wherein the third client hosts a first instance of a dispatch service configured to:
    send a second request to the data transport service, wherein the second request comprises a second authentication credential for the third client,
    wherein the third client is registered with the data transport service, and
    wherein the first instance of the data transport service is associated with the back-end service;
  wherein the data transport service is further configured to:
    receive the second request from the first instance of the dispatch service;
    authenticate the second request using the second authentication credential;
    parse the second request to obtain a second command for retrieving a second message stored in the physical queue, wherein the second message comprises telemetry data;
    identify the second message using the first virtual queue,
      wherein a second entry for the second message is stored in the first virtual queue,
      wherein the second entry comprises a second message priority for the second message, and
      wherein the second message priority is the highest message priority of any message in the first virtual queue:
    retrieve the second message from the physical queue; and
    send a first response comprising the second message to the third client.

10. The system of claim 9, wherein the first instance of the dispatch service is further configured to:
send the second message to the back-end service; and
wherein the back-end service is configured to:
  receive the second message from the first instance of the dispatch service; and
  process the telemetry data of the second message.

11. The system of claim 10, wherein the first instance of the dispatch service is further configured to:
send a third request to the data transport service, wherein the third request comprises the second authentication credential; and
wherein the data transport service is further configured to:
  receive the third request from the first instance of the dispatch service;
  authenticate the third request using the second authentication credential;
  parse the third request to obtain a third command for deleting the second message;

deleting the second message from the physical queue; and deleting the second entry from the first virtual queue.

12. The system of claim 11, further comprising:

the second client operatively to the second network, wherein the second client hosts the second client application configured to:

send a fourth request to the data transport service, wherein the fourth request comprises the third authentication credential for the second client, a third message, and a third message priority for the third message; and wherein the data transport service is further configured to:

receive the fourth request from the second client application;

authenticate the fourth request using the third authentication credential;

parse the fourth request to obtain a fourth command for storing the third message in the physical queue;

store the third message in the physical queue; and store a third entry for the third message in the second virtual queue, wherein the third entry comprises the third message priority.

13. The system of claim 9, wherein the first virtual queue only comprises messages received from clients located in a first geographic location, wherein the second virtual queue only comprises messages received from clients located in a second geographic location, and wherein the first client computing device is located in the first geographic location.

14. The system of claim 9, wherein the authentication credential is selected from the group comprising a unique client identifier and a client-generated signature.

15. A non-transitory computer-readable storage medium, comprising executable instructions to:

receive, from a first client application executing on a first client operatively connected to a first network, a first request comprising a first authentication credential for the first client, a first message comprising a plurality of telemetry data, and a first message priority for the first message;

identify a classification of the plurality of telemetry data;

match the classification to a back-end service configured to process telemetry data having the classification;

route the first request to a first physical node associated with the back-end service;

authenticate, after routing the first request, the first request using the first authentication credential;

parse, after authenticating the first request, the first request to obtain a first command for storing the first message in a physical queue associated with the back-end service, wherein the physical queue comprises a plurality of messages received from the first client application and a plurality of messages received from a second client application executing on a second client;

store the first message in the physical queue;

identify a first virtual queue corresponding to the physical queue and comprising an entry for each of the plurality of messages received from the first client application, wherein the first virtual queue is not a component of the physical queue, and wherein the first virtual queue stores only entries corresponding to messages in the physical queue;

identify a second virtual queue corresponding to the physical queue and comprising an entry for each of the plurality of messages received from the second client application, wherein the second virtual queue is not a component of the physical queue, and wherein the second virtual queue stores only entries corresponding to messages in the physical queue;

store, in the first virtual queue, a first entry corresponding to the first message, wherein the first entry comprises the first message priority;

receive a second request from a first instance of a dispatch service executing on a third client registered with a data transport service executing on the first physical node, wherein the first instance of the dispatch service is associated with the back-end service, and wherein the second request comprises a second authentication credential for the third client;

authenticate the second request using the second authentication credential;

parse the second request to obtain a second command for retrieving a second message stored in the physical queue;

identify the second message using the first virtual queue, wherein a second entry for the second message is stored in the first virtual queue, wherein the second entry comprises a second message priority for the second message, and wherein the second message priority is the greatest message priority of any message priority comprised by an entry stored in the first virtual queue;

retrieve the second message from the physical queue; and send a first response comprising the second message to the third client.

16. The method of claim 1, wherein the classification is hardware fault event.

17. The method of claim 1, wherein the first client is operatively connected to a first network, and wherein the second client is operatively connected to a second network.

* * * * *